No. 738,893. PATENTED SEPT. 15, 1903.
G. H. ELLIS.
FLAX BREAKING MACHINE.
APPLICATION FILED JUNE 22, 1903.
NO MODEL. 4 SHEETS—SHEET 2.
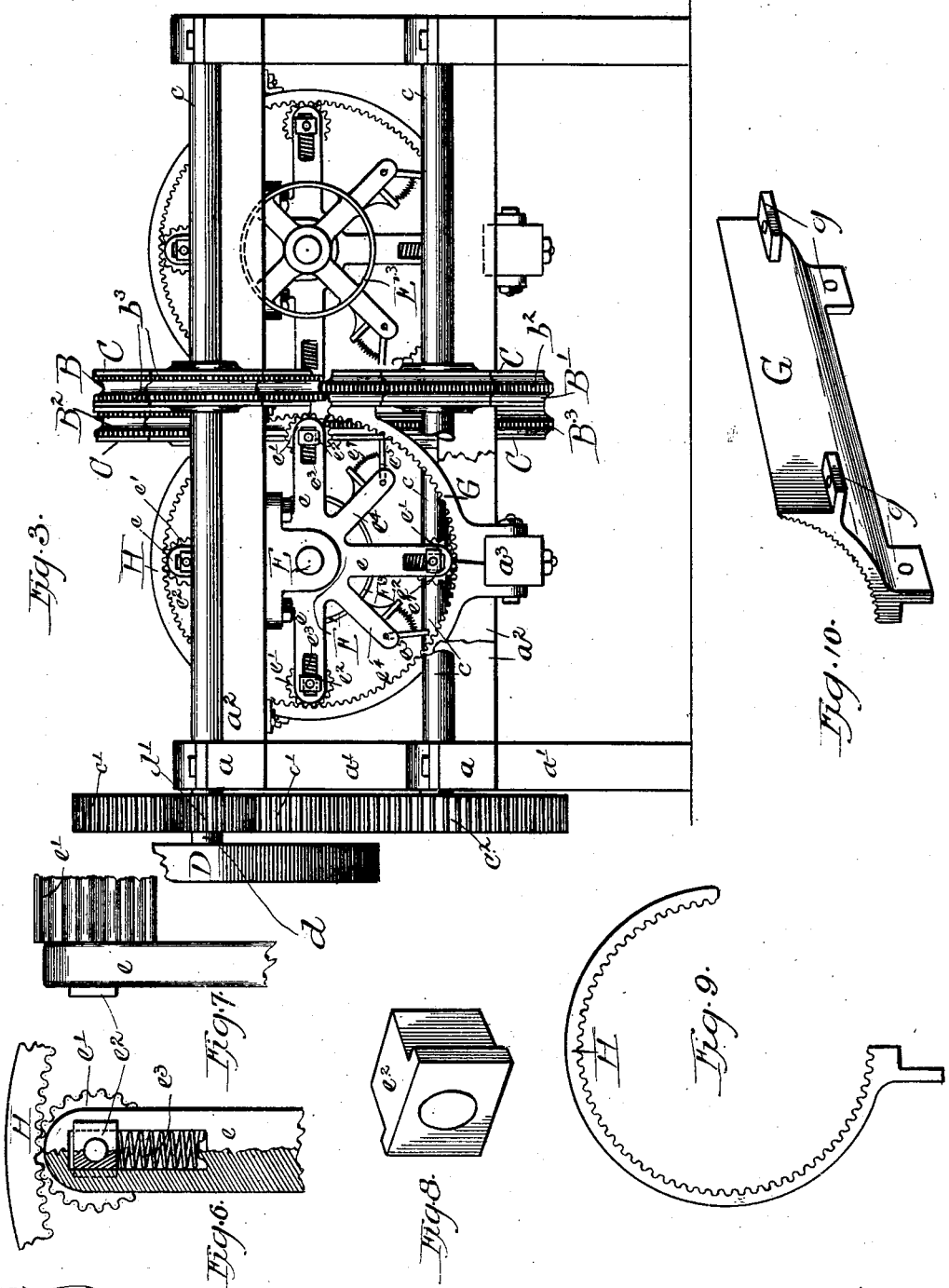

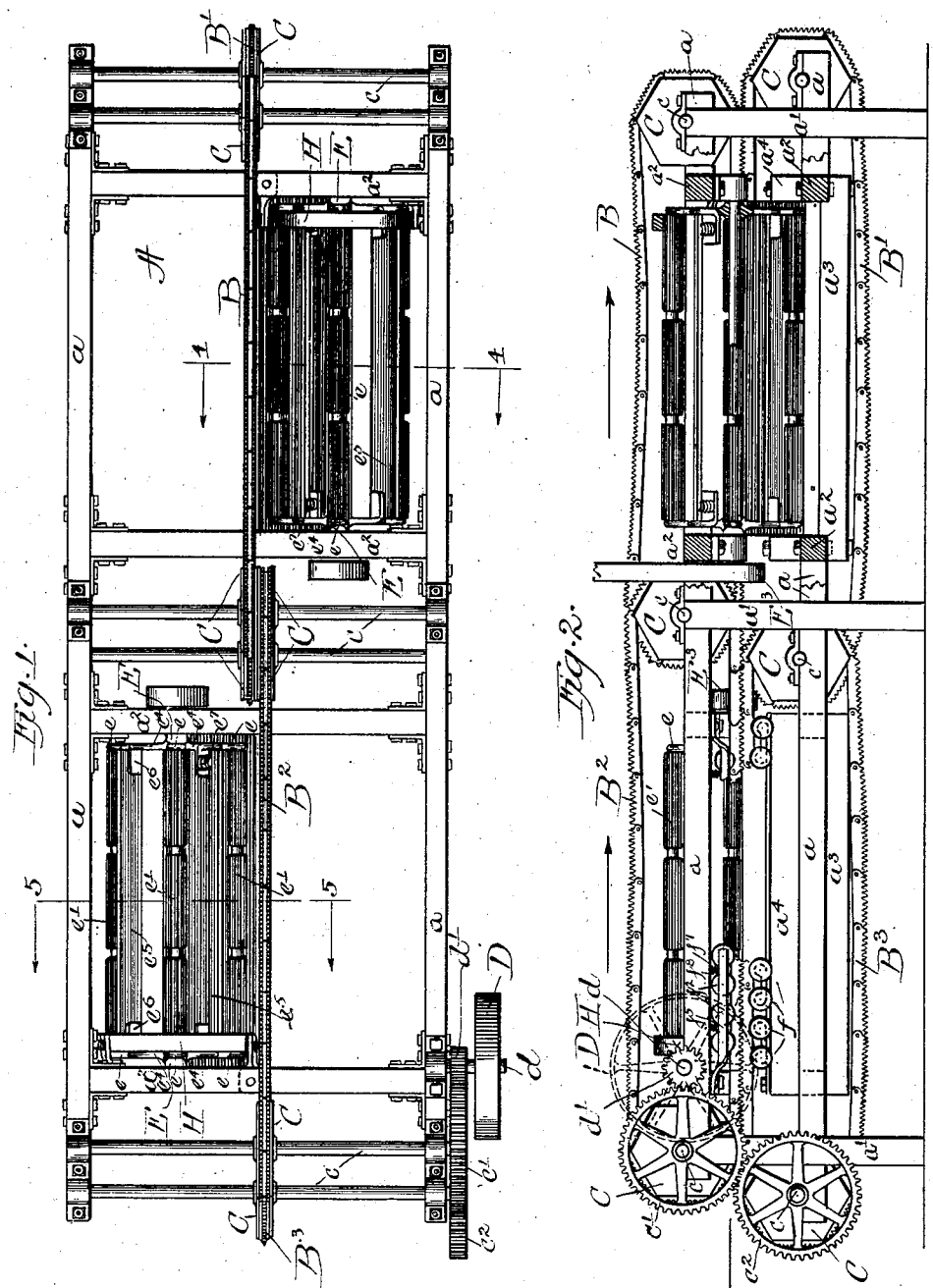

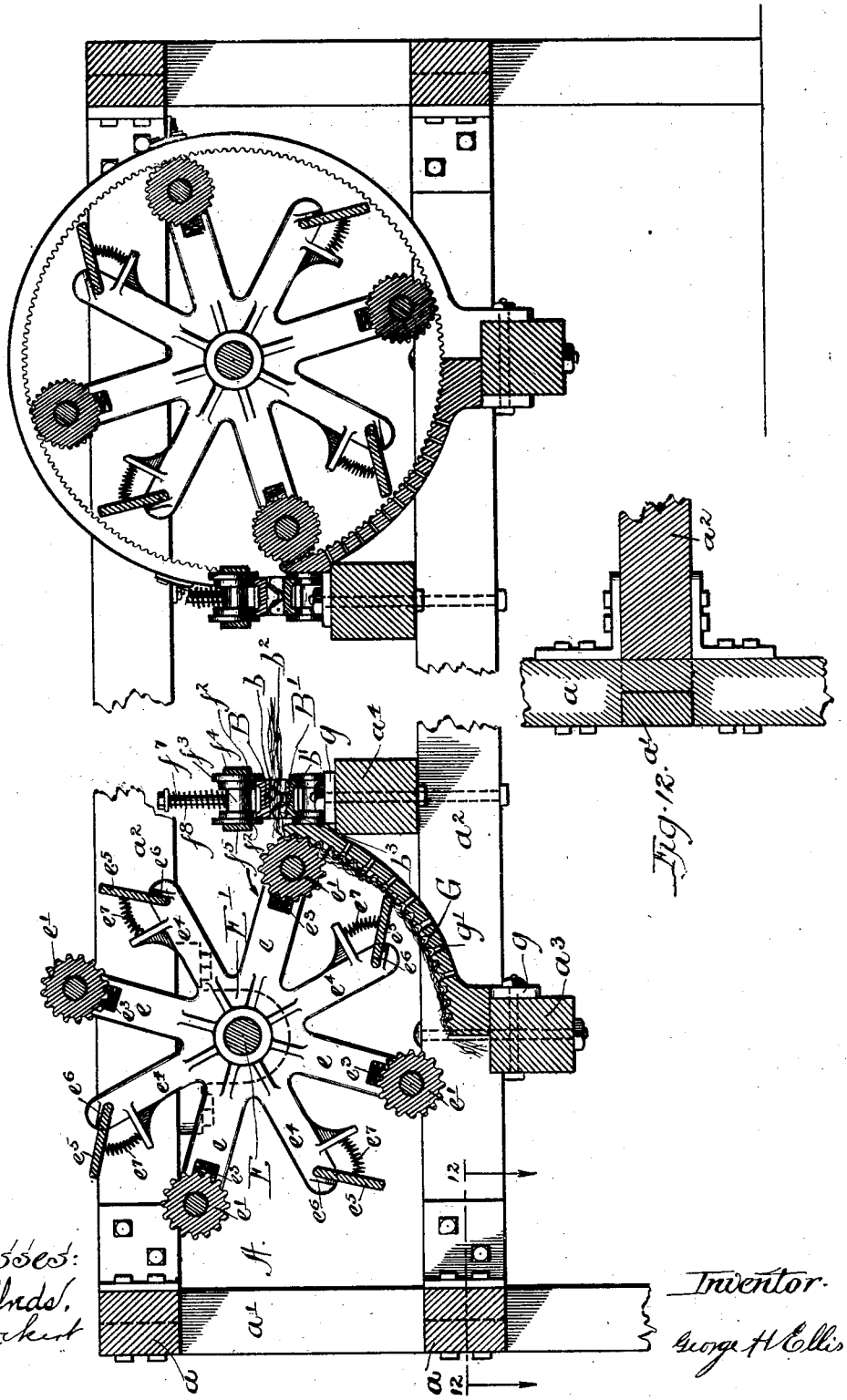

No. 738,893. PATENTED SEPT. 15, 1903.
G. H. ELLIS.
FLAX BREAKING MACHINE.
APPLICATION FILED JUNE 22, 1903.
NO MODEL. 4 SHEETS—SHEET 4.
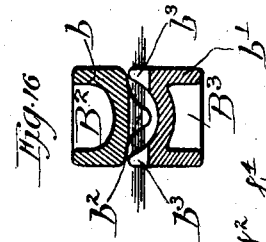
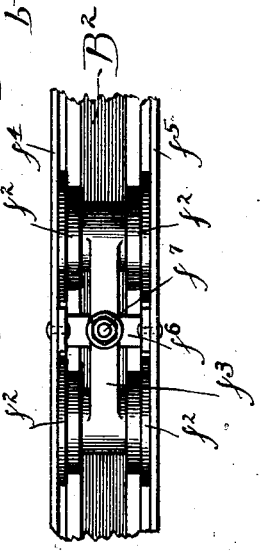
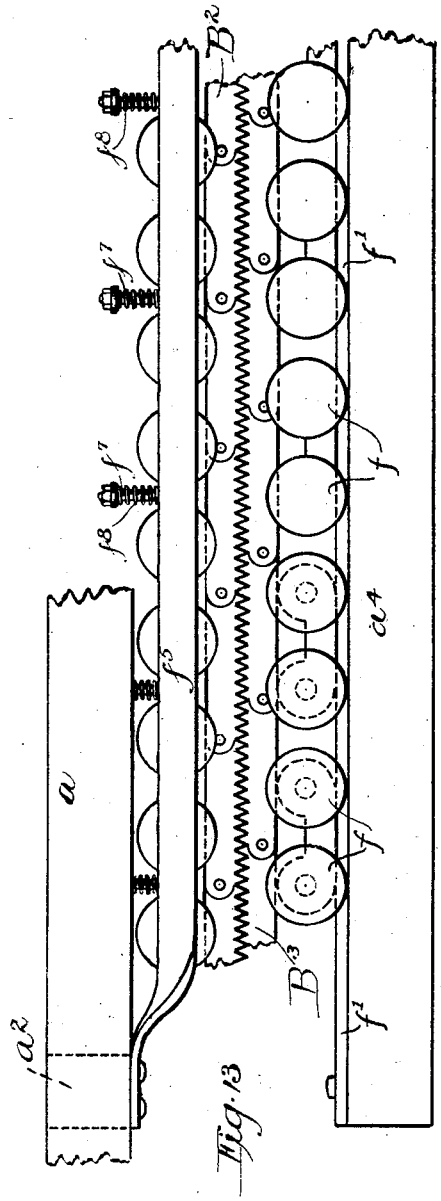
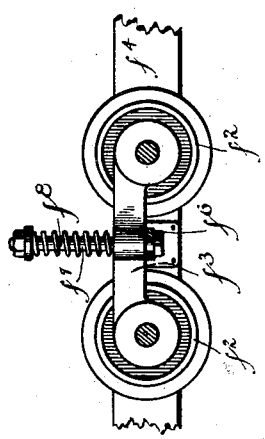
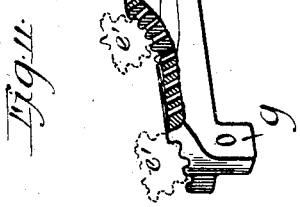
Witnesses:
P. H. Alfreds.
D. E. Eckert
Inventor.
George H. Ellis No. 738,893. Patented September 15, 1903.

UNITED STATES PATENT OFFICE.

GEORGE H. ELLIS, OF CHICAGO, ILLINOIS, ASSIGNOR TO WILLIAM DEERING, OF CHICAGO, ILLINOIS.

FLAX-BREAKING MACHINE.

SPECIFICATION forming part of Letters Patent No. 738,893, dated September 15, 1903.

Application filed June 22, 1903. Serial No. 162,535. (No model.)

*To all whom it may concern:*

Be it known that I, GEORGE H. ELLIS, a citizen of the United States, residing at Chicago, in the county of Cook and State of Illinois, have invented certain new and useful Improvements in Flax-Breaking Machines, of which the following is a complete specification.

It is well understood that grass and other foreign substances present in the flax-straw will unless removed before the breaking operation be found mingled with the fiber, and if not cleaned from the fiber it will vitiate the quality and detract from the appearance of the resulting twine or manufactured product.

To clean the straw before breaking in the flax-breaker as ordinarily constructed requires an additional machine as well as an additional handling, and, furthermore, the principle upon which such flax-breaks operate precludes the introduction of a cleaning or scutching process in connection with the breaking operation. In consequence of this fact flax-straw containing grass and other foreign substances after being passed through the breaking-rollers requires a subsequent scutching. This subsequent scutching in removing the grass, the top branches of the flax, &c., also removes much valuable fiber in the form of tow and constitutes, therefore, a source of considerable loss. Another difficulty encountered in machines of this class is the fact that the fiber is often formed into a web, and hence is not in a convenient form for subsequent baling and cleaning.

The machine constituting the subject of this invention overcomes the above-mentioned difficulties in the following respect: First, it operates upon the straws without disturbing the relative longitudinal position of them or the fiber formed therefrom, and thus, in effect, leaves the fiber in the form of stricks or hanks, in which condition it is in a convenient form for subsequent handling and cleaning; secondly, the novel construction of the machine admits of a simultaneous scutching and cleaning in connection with the breaking of the straw, whereby the fiber is prepared more expeditiously and economically and the formation of tow in the cleaning practically avoided. In addition to the above results accomplished by this invention it may be added that it also avoids the breaking of the straw by a longitudinal pull thereon caused by the usual arrangement of the breaking-rollers in series.

Briefly stated, my invention consists in coöperating loops of chain for grasping the straw intermediate and transverse of its length and conveying it past breaking-rollers and cleaning devices which operate upon the projecting ends while in motion, the said breaking-rollers being revolubly mounted upon a common axis arranged longitudinally with respect to the movement of the chain and operating upon the straw in conjunction with a longitudinally-toothed plate arranged adjacent to said grasping-chain.

In the drawings, Figure 1 represents a plan view of the complete machine. Fig. 2 is a side elevation, and Fig. 3 an end elevation, of same. Fig. 4 represents a partial transverse section taken on the line 4 4 of Fig. 1. Fig. 5 represents a similar partial transverse section taken on the line 5 5 of Fig. 1. Fig. 6 is a fragmentary view, partially in section, of the arm of the head carrying the breaking-rollers, showing also the breaking-roller supported thereby and a portion of the toothed annular segment. Fig. 7 shows a corresponding side elevation of same. Fig. 8 is a view in perspective of one of the sliding blocks which form journal-bearings from the breaking-rollers. Fig. 9 represents a side view of the toothed annular segment. Fig. 10 is a view in perspective, illustrating the construction of the toothed plate which coöperates with the breaking-rollers. Fig. 11 represents a partial longitudinal section in perspective of the same, the coöperating breaking-rollers being indicated by dotted lines and the increasing fineness of the pitch of the teeth or flutes being shown. Fig. 12 is a plan section as indicated by the line 12 12 in Fig. 4, showing the manner in which the cross-ties of the frame are connected with the main sills. Fig. 13 is a longitudinal elevation of a portion of the machine, illustrating the method of securing a yielding pressure between the contacting parts of the grasping-chain. Fig. 14 represents a longitudinal section of an individual truck of the series shown in Fig. 13. Fig. 15 is a plan of same, and Fig. 16 is an enlarged transverse section through two contacting links of the grasping-chain.

Referring to the drawings, A designates the main frame of the machine, which consists, preferably, of the longitudinally-arranged parallel side sills $a$, the vertical supports $a'$, connected therewith, and the cross-ties $a^2$, thus forming a rigid rectangular frame. Arranged centrally and longitudinally with respect to the frame of the machine are the several endless chains forming loops and constituting the grasping-chain. The forward loops B and B' are vertically coincident and coöperatively related with each other, while the rearward loops B² and B³ are similarly arranged, but in a plane slightly disposed laterally relative to the vertical plane occupied by the forward loops. These several loops of the grasping-chain are borne and driven by the sprocket-wheels C, which are mounted upon the shafts $c$. These shafts $c$ journal in similar bearings secured to the sills $a$ of the main frame A. The shafts supporting and driving the lower two loops B' and B³ of the grasping-chain, it will be noticed, are not located directly beneath the corresponding shafts of the upper two loops. Such an arrangement permits of constant contact between the upper and lower loops of the grasping-chain as the chain leaves the sprocket-wheels C notwithstanding the varying radius of the said sprocket-wheels caused by the comparatively great length of the sprocket-chain links. Each of the two shafts $c$ intermediate of the length of the machine supports the inner ends of both the forward and rearward corresponding loops, and therefore each shaft bears two sprocket-wheels rigidly secured thereto. Motion is communicated to the several loops as follows: A stub-shaft $b$ is secured to the main frame, and on this stub-shaft is placed the driving-pulley D. As one piece with this pulley is the pinion $d'$, meshing with and driving the gear $c'$, which is rigidly secured to the rear upper chain-support shaft $c$. The said gear $c'$ meshes with the gear $c^2$, which is rigidly secured to the rear lower chain-supporting shaft $c$. In this manner motion is communicated to the rearward loops B² and B³ and through the intermediate chain-supporting shafts and the sprocket-wheels thereon to the forward loops B and B'.

The engaging portions of the coöperating loops are held in yielding contact by the means shown in Fig. 2 and in detail in Figs. 13, 14, and 15. The upper or engaging portion of the lower loops is held up rigidly in working position and also in a line by a series of antifriction-rollers $f$, which journal on bearings secured to the bar $f'$, which is in turn rigidly connected to the frame of the machine, as shown in Figs 2, 4, or 13. The lower or engaging portion of the upper loops is held yieldingly in working position and in contact with the engaging part of the lower loops by devices such as shown in Figs. 14 and 15. Here the rollers $f^2$ are journaled on a frame $f^3$, each frame supporting four rollers. Between the bars $f^5$ and $f^4$ (see Fig. 15) is riveted or otherwise secured a transverse connecting member $f^6$, as shown in Fig. 14. A bolt $f^7$, passing through a centrally-located hole in this member and upwardly through a corresponding hole in the frame $f^3$ and receiving a compression-spring $f^8$, serves to hold the frame $f^3$ in contact with the connecting member $f^6$ and yet permit an upward movement if pressure is applied in that direction. The opening in the frame $f^3$ is made somewhat larger than the bolt $f^7$ in order to admit of a slight longitudinal rocking movement of the said frame. The bolt $f^7$ is provided with a nut and washer to bear against the spring. By adjustment of the nuts on the bolts $f^7$ on each of the frames bearing the antifriction-rollers any desired degree of pressure can be attained between the engaging portion of the several loops of grasping-chain, and in this way the flax-straw or material operated upon can be held firmly therebetween.

The grasping-chain consists of links of considerable length and width, serrated on the surfaces which come in contact with the straw, as shown in Figs. 4 and 16. The links of the lower loops of the grasping-chain are preferably made with a double serration, or what might be termed "two rows of teeth," longitudinally arranged and provided with a depression between them. The configuration of these links is clearly illustrated in Fig. 16, where $b$ represents a section of a link of an upper loop B or B², and $b'$ represents an opposing link of a lower loop B' or B³. $b^2$ is a tooth of the single-serrated row above, and $b^3$ $b^3$ are the teeth of the double-serrated row below, with the depression between. This depression receives the points of the single-serrated teeth in the links of the chain above, and thus forms jaws which will afford a two-point support below and a one-point support above for the flax-straw lying between.

From the foregoing it will be seen that if flax-straw is fed to the grasping-chain, the straw being presented thereto transversely relative to and intermediate of its length, it will be conveyed rearwardly and the ends thereof project laterally and be free to be acted upon by the breaking mechanism. An inspection of Fig. 1 will also reveal the fact that as the straw is passed along between the loops B and B' it will be operated upon by the breaking mechanism adjacent thereto and as it passes from the loops B and B' to the loops B² and B³ it will be grasped by the latter loops on a portion of the stalk already acted upon by the said breaking mechanism. The unbroken portion of the stalk will thus be free to be acted upon by the second set of breaking-rollers.

The essence of the invention lies chiefly in the novelty of the construction of the breaking mechanism, which will now be described.

Journaled in suitable bearings on the upper cross-ties $a^2$, at the forward end of the main frame A, is the shaft E, extending longitudinally with respect to the frame of the machine and parallel with the grasping-chain. Rigidly secured to the ends of this shaft E are the spiders E', provided with a series of radiating arms $e$, in which are journaled at the free ends thereof the breaking-rollers $e'$, which extend between and are supported by corresponding arms of each spider. The connection between the said arms and breaking-rollers is effected by means of a sliding box $e^2$, in which journals the shafts of the several rollers, the sliding box being positively limited in its outward movement and yieldingly restrained from movement in the opposite direction by the spring $e^3$, as shown in Figs. 4, 5, and 6. Preferably alternately disposed relative to the arms $e$, which support the breaking-rollers $e'$, are the arms $e^4$, on the free ends of which are pivotally mounted the scutching-blades $e^5$. Stops $e^6$ limit the forward or outward swing of these blades, the arrangement being such that the outer edges of the several blades approach but do not reach actual contact with the grooved or toothed plate G, and the coil-springs $e^7$ are interposed between shoulders on said arms $e^4$ and the scutcher-blades, which operate to press the blades against the said stops $e^6$. The plate G is of a curvature corresponding to the path of movement of the breaking-rollers $e'$, with which it is adapted to mesh. This plate is secured to the longitudinal sills $a^3$ and $a^4$, which in turn are bolted to the cross-ties $a^2$, as shown in Fig. 4. The teeth of the breakers, as well as the teeth of the plates, are graduated correspondingly in fineness, as shown in Fig. 11, the rearward portion of the plates, operatively considered, having teeth of a finer pitch than those on the forward end, as is customary in flax-breaks. The plates G are secured to the sills $a^3$ and $a^4$ by means of bolts through the lugs $g$. Apertures $g'$ are provided in the plate G between the teeth to allow the shives resulting from the breaking to escape therethrough. As this toothed plate G constitutes only a segment of a complete circular form, it becomes necessary to control the movement of the breaking-rollers when not engaged therewith, and thus insure a proper engagement of the said breaking-rollers when coming in mesh with said toothed plate. This is accomplished by placing a segment H of an internal gear in a position to complete the circular form of which the toothed plate forms a part. A small gap is left, as shown in Fig. 5, for the introduction of the flax-straw, but not of a sufficient width, however, to disturb the proper relative position of the rollers. A side elevation of this segment is shown in Fig. 9. A corresponding set of breaking-rollers, scutchers, toothed plate, &c., is arranged on the opposite side of the grasping-chain; but as they are an exact duplicate of those just described further description is unnecessary. Rapid motion is communicated to the breaking-rollers by means of a belt leading from the source of power and passing around the pulley $E^3$ on the shaft E.

It is evident that the toothed plate need not be placed below the level of the straw operated upon, for the effect would be the same should they be placed above and the breaking-rollers revolved in the opposite direction. Neither is it necessary to preserve any definite number of breaking-rollers, for a greater or less number would accomplish the same results.

The operation of the machine is as follows: Flax-straw is presented by any means to the grasping-chain intermediate of and transversely relative to its length. The chain holds the straw tightly, leaving the ends projecting laterally therefrom, and conveys it along the toothed plates. The breaking-rollers, revolving rapidly in the direction indicated by the arrows, come in contact with the straw adjacent to the chain. The internal gear-segment and the toothed plate itself cause each breaking-roller to rotate in a direction as indicated by the arrow in Fig. 4 and in a direction with respect to its own axis opposite to that of the spiders carrying the rollers, the movement being the same as in epicyclic gearing. As the straw passes over the toothed plate it is alternately subjected to the action of the breaking-rollers and scutching-blades until the stalk is relieved of its waste portion and the fiber alone remains, the shives dropping through the apertures $g'$ in said plate or brushed from the side thereof by the scutchers. The effectiveness of the scutching-blades is increased and their action facilitated by the broken straws springing up from the grooves, as shown in Fig. 4. As the breaking-roller passes over the stalks the extra length taken up by the crimping received is drawn from the free end, and as the breaking-roller leaves the straw the grasping-chain, advancing transversely relative to the movement of the said roller, will exert a tendency to straighten the crimp of the straw and to pull it out of the grooves, thus bringing it to a position where it will be more susceptible to the action of the scutching-blades. As the grooves or teeth in the plate and rollers increase in fineness as the breaking operation proceeds, it will result in a complete breaking and cleaning. The straw is then passed to the second set of coacting loops, which grasp it on the part already cleaned, thus leaving the free end to be similarly treated by the second set of breaking-rollers, after which the straw is deposited in the rear of the machine in parallel evenly-disposed stricks or bunches.

What I claim as my invention, and desire to secure by Letters Patent, is—

1. In a flax-breaking machine, in combination means for grasping, holding and conveying the straw transversely relative to its length, a longitudinally-toothed plate arranged adjacent thereto, over which pass the projecting ends of the straw being operated upon, a series of revolving correspondingly-toothed breaking-rollers operating in conjunction therewith, and means for driving the said grasping, holding and conveying device and the said breaking-rollers, substantially as described.

2. In a flax-breaking machine, in combination means for grasping, holding and conveying the straw transversely relative to its length, a longitudinally-toothed plate arranged adjacent thereto, over which pass the projecting ends of the straw being operated upon, the teeth of said plate progressively increasing in fineness, a series of revolving correspondingly-toothed breaking-rollers operating in conjunction therewith, and means for driving the said grasping, holding and conveying device and the said breaking-rollers, substantially as described.

3. In a flax-breaking machine, in combination coöperating loops of endless chain adapted to grasp the flax-straw and convey it transversely of its length, leaving the free ends projecting laterally therefrom, a series of breaking-rollers rotatably mounted on independent axes and collectively mounted to revolve about a common axis, said axis being longitudinally disposed relative to the movement of said endless chains, and the breaking-rollers being located to operate adjacent thereto, means for driving the said endless chains and breaking-rollers and a longitudinally-toothed plate located adjacent to the said endless chains and adapted to operate upon the flax-straw in conjunction with the said breaking-rollers.

4. In a machine for decorticating the straw of flax or other exogenous plants, a breaking device comprising a plurality of toothed rollers revolubly mounted upon a common axis, and a correspondingly-toothed plate operating in conjunction with said rollers, a yielding movement being provided between said plate and rollers, substantially as described.

5. In a machine for decorticating the straw of flax or other exogenous plants, a breaking device comprising a plurality of toothed rollers revolubly and yieldingly mounted upon a common axis, and a correspondingly-toothed plate operating in conjunction with said rollers, substantially as described.

6. In a flax-breaking machine, in combination a grasping-chain adapted to hold the straw and convey it transversely relative to its length, scutching-blades and breaking-rollers adapted to operate upon the straw while being conveyed by and in the grasp of said chain, and a toothed plate operating in conjunction with said scutching-blades and breaking-rollers.

7. In a flax-breaking machine, in combination a grasping-chain adapted to hold the straw and convey it transversely relative to its length, scutching-blades and breaking-rollers adapted to operate simultaneously upon the straw while being conveyed by and in the grasp of said chain, and a toothed plate operating in conjunction with said scutching-blades and breaking-rollers.

8. In a flax-breaking machine, in combination a grasping-chain adapted to hold the straw and convey it transversely relative to its length, scutching-blades and breaking-rollers adapted to operate upon the straw while being conveyed by and in the grasp of said chain, the said scutching-blades and breaking-rollers having their axes of movement coincident, and a toothed plate operating in conjunction therewith.

9. In a machine for decorticating the straw of flax or other exogenous plants, a breaking device comprising a plurality of toothed rollers revolubly mounted upon a common axis, and a correspondingly-toothed plate operating in conjunction with said rollers, substantially as described.

Signed at Chicago this 8th day of June, 1903.

GEORGE H. ELLIS.

In presence of—
T. H. ALFREDS,
D. E. LOCKERT.